United States Patent

Horvath

[15] 3,668,685

[45] June 6, 1972

[54] COMPOSING METHOD AND APPARATUS

[72] Inventor: Robert M. Horvath, Parma, Ohio

[73] Assignee: Harris-Intertype Corporation, Cleveland, Ohio

[22] Filed: Feb. 20, 1970

[21] Appl. No.: 16,626

[52] U.S. Cl. ..............................340/324 A, 33/1 M, 95/4.5, 340/337, 356/169, 356/171

[51] Int. Cl. ..........................................................G06f 3/14

[58] Field of Search..........................340/324 A, 337, 172.5; 235/61.11 G; 178/17, 18, 19, 20, 25; 356/169, 170, 171; 33/1 M

[56] References Cited

UNITED STATES PATENTS

| | | | |
|---|---|---|---|
| 3,256,516 | 6/1966 | Melia et al. | 340/324 A X |
| 3,379,835 | 4/1968 | Gilbert | 178/18 |
| 3,423,528 | 1/1969 | Bradshaw et al. | 178/19 |
| 3,437,873 | 4/1969 | Eggert | 340/324 A X |
| 3,471,743 | 10/1969 | Olsson et al. | 340/324 A X |
| 3,522,664 | 8/1970 | Lambright et al. | 178/18 X |
| 2,922,333 | 1/1960 | Subach et al. | 33/1 M X |
| 3,276,124 | 10/1966 | Jeffress et al. | 33/1 M |
| 3,372,485 | 3/1968 | Mangus et al. | 33/1 M |
| 3,403,391 | 9/1968 | McCown | 340/324 A |
| 3,437,873 | 4/1969 | Eggert | 340/324 A X |
| 3,455,026 | 7/1969 | Brault | 356/171 X |
| 3,500,379 | 3/1970 | Gibbons et al. | 33/1 M X |

*Primary Examiner*—David L. Trafton
*Attorney*—Yount and Tarolli

[57] ABSTRACT

Composing method and apparatus for publications such as newspapers in which copy from various sources is entered into a computer in coded form f or use in controlling a phototypesetter to prepare a page copy. Certain copy including artwork which may be half tone or continuous tone is scanned to provide the numerical data necessary for controlling the phototypesetter while text material is first edited on an editing terminal and then stored with or without phototypesetting instructions in the computer. Each item to be included in the publication is identified by a heading and a layout department instructs the computer as to where the items are to appear. For this purpose the layout department has a layout terminal for displaying page areas with previously assigned sections outlined and identified and for entering coordinates of newly assigned sections into the computer. The terminal can display magnified portions of the page area. In reproducing continuous tone copy, dot characters are stored in a character memory and used to provide different half-tone screen sizes.

6 Claims, 6 Drawing Figures

INVENTOR
ROBERT M. HORVATH
BY Yount and Tarolli
ATTORNEYS

INVENTOR
ROBERT M. HORVATH
BY Yount and Tarolli
ATTORNEYS

INVENTOR
ROBERT M. HORVATH
BY Yount and Tarolli
ATTORNEYS

INVENTOR
ROBERT M. HORVATH
BY Yount and Tarolli
ATTORNEYS

INVENTOR
ROBERT M. HORVATH

BY Yount and Tarolli
ATTORNEYS

COMPOSING METHOD AND APPARATUS

This disclosure relates to application Ser. No. 13,069, filed Feb. 20, 1970; application Ser. No. 591,734, filed Nov. 3, 1966, now U.S. Pat. No. 3,588,870; and application Ser. No. 710,349, filed Mar. 4, 1968, now U.S. Pat. No. 3,581,302.

The present invention relates to a method and apparatus for composing pages of printed material and, particularly, to such a method and apparatus suitable for composing newspapers, books and magazines as is disclosed in the Kolb and Morrison application entitled Composing Method and Apparatus, Ser. No. 13,069, filed Feb. 20, 1970 and assigned to the same assignee as the present invention.

In composing pages of various publications, it is common for items on a various page to be prepared by different sources at different times. This material must be assembled and arranged as it will appear in the publication, prior to preparing printing plates.

In the newspaper industry, a page is commonly composed by pasting up separate items of prepared copy. The pasted up page is then used as the starting point for making a corresponding printing plate by photographic and photoetching techniques.

Newspapers and other publications have what is termed a layout department whose function is to allocate particular space in the publication to particular items or departments.

In the case of newspapers, some of the advertisements are commonly received in the form of prepared copy from a national source. Conventionally, this prepared copy is, during composing, pasted onto an allocated section of a particular page in the newspaper as specified by the layout department of the newspaper. Local advertisements, which may include copy prepared outside of the newspaper as well as internally, are also sent to the composing room to be pasted into the space allotted to the particular advertisement by the layout department. Both national and local advertisements are often primarily artwork. Similarly, the layout department also allots space to the classified advertisement department and to the editorial staffs. In the newspaper industry, the term editorial space is used to generically describe space in the newspaper other than the advertisements and the classified sections. The space allotted for editorial will include those pictures associated with the editorial text. Some of the editorial material, such as daily columnists, will require a fixed amount of space daily and have a fixed location in the newspaper. Other editorial material is supplied by the various reporting staffs of the newspaper so as to fill the space as it is allocated to the particular reporting staff by the layout department.

In accordance with the present invention, a computer is utilized to store layout information for a publication and the layout department is provided with a computer terminal which is adapted to display requested page areas with the sections of the page area which have been previously allocated to a particular item indicated as assigned space, preferably by outlining the space. In the preferred practice of the invention, the layout terminal has visual means which may be utilized to indicate on the display of the page, a section on the displayed page area to be assigned to a particular item and the layout terminal on command will enter the coordinate data concerning the space indicated into the storage of the computer so that when the page area is again requested from the computer, the selected space will be outlined or otherwise visually blocked off. In addition to the coordinate data in the preferred practice of this invention, item identifying information is also entered into the computer so that the display will visually indicate the item which is to be placed into the allocated areas.

The layout terminal in accordance with the present invention normally provides a normal size visual display of a particular item or particular page area on the visual means. However, the terminal has control means which may be utilized for providing an enlarged visual display of only a particular item or page area and for entering coordinates of the displayed information in the form of page coordinates.

In the preferred practice the layout terminal includes a cathode ray tube, means for producing a visual display of a particular item or area on the face of the tube in response to coded data and means for deriving the page coordinates of a point on the tube. The means for deriving the coordinates include slidable markers for marking the X and Y coordinates of the point. The markers have associated therewith voltage divider means which have an output which is dependent upon the position to which the marker has been moved. The voltage output is then fed to a digital-to-analog device which converts the voltage to a number for indicating the coordinates of the point. The voltage divider means has a variable voltage supply for selectively varying the voltages at the opposite ends of the decoder depending upon whether the particular item is to be displayed in its normal or enlarged size so as to provide an indication of the page coordinates of the point regardless of the size of display. Upon command, the coordinate data for any item may be stored in the computer.

After the space in the newspaper or publication has been allocated by the layout department by storing the layout information in the computer, the computer is then operated to either prepare a page copy with the areas for the various items outlined and the identification of the item displayed in the page areas or to operate a cathode ray tube phototypesetting apparatus to compose the pages including editorial material with the areas for the artwork and the prepared copy otherwise blocked off. The prepared copy from various sources is scanned and stored as a run-length code in the computer and the computer operates to control cathode ray tube photocomposing apparatus to produce the entire composed page including text and artwork.

When a prepared copy, such as artwork is scanned to provide digital information to be entered into the computer for reconstructing the copy. The scanning is such that the copy may be black-and-white line copy or half-tone copy or a continuous tone copy, e.g. a conventional photograph. The scanning in the preferred practice produces a code which indicates the length of the segments of a scan of different light levels and in the case of the continuous tone photograph, the light levels are utilized to determine the dot size to be used in making a half-tone reconstruction of the photograph. For such copy the character memory of the phototypesetting apparatus preferably includes instructions for forming a character comprised of a dot pattern which when repeated along a scan line provides half-tone copy of proper dot size. Each dot pattern is identified by a character code and during scanning the light level from the copy is converted to a digital number which is decoded to specify the proper dot character for producing the half-tone copy. Reproduction of a half-tone copy for color purposes may be accomplished by the use of color filters during scanning.

A better understanding of the invention and its advantages will be derived from the following detailed description of a specific form of the preferred embodiment thereof made with reference to the accompanying drawings forming a part of the present specification for all subject matter disclosed therein and wherein.

Figure 1:
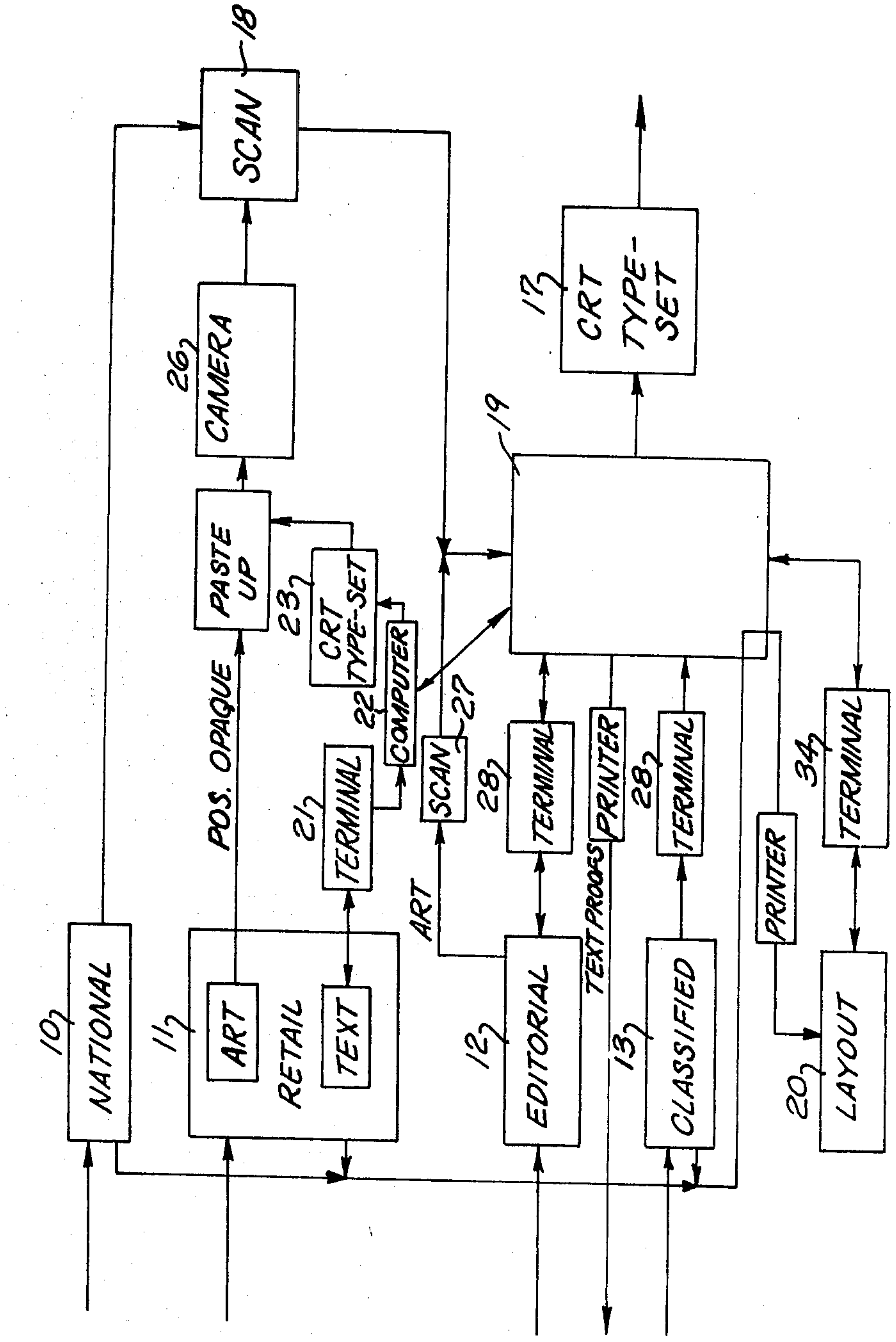
FIG. 1 is a schematic diagram of the present invention as applied to newspaper composing.

Referring to FIG. 1 which is a flow diagram indicating the handling or composing of a newspaper page in accordance with the present invention, material to be composed may be received from a national advertisement department 10, a retail advertisement department 11 which is primarily local advertisements, an editorial department 12, and a classified department 13. The material received by the national advertisement department 10 is usually prepared copy which is suitable for photographing for the purpose of preparing a printing plate. The prepared copy may include text as well as artwork. In accordance with the disclosed embodiment of the invention, the national advertisement is given an identification and is scanned by a scanner 18 which digitizes the prepared copy and the digitized information and the identification heading is entered into the memory bank of a computer 19. The information which is derived from scanning the copy is such as to enable the computer to provide the necessary commands for causing a cathode ray tube phototypesetting apparatus 17 to reproduce the copy as part of a page of the publication. Information related to the ad is also delivered to a layout department 20. The function of the layout department is to assign newspaper space to the ad.

The retail advertisement department which handles local advertisements commonly prepares the ad for publication. These ads will generally include both artwork and text material. In the illustrated embodiment, the retail advertisement department has a computer terminal 21 for a computer 22 which enables the retail department to code the text of the ad so that it may be printed by a cathode ray tube phototypesetter 23. The terminal 21 has a cathode ray tube for displaying the text material stored in the computer 22 and is preferably of the type shown in U.S. Pat. No. 3,165,045 which enables the operator to edit and change the material. The edited material may then be printed out in the phototypesetting apparatus 23 and sent to a paste up table 24 to be combined with the art copy. The artwork and the text material are pasted up together to form the desired retail ad and this ad is photographed by a camera department 26 to provide copy for scanning by the scanner 18. The material from the retail ad department is scanned and entered into the computer together with the identification of the copy. Information related to the ad is sent to the layout department. The computer 22 is linked to the computer 19 so that the insertion of the type justifying or typesetter setting instructions may be done by the computer 19 if desired.

The newspaper industry generally assigns the term editorial to generically described material in the newspaper which is not sponsored and so does not fall into the classifications of national advertisement, retail advertisement or classified advertisement. Accordingly, editorial includes what is commonly referred to as to the sport pages, the women's pages, the financial pages, the editorial pages and general news pages including both local and international news. The editorial department 12 has a computer terminal 28 where the editorial department can code text material and send the text material into the computer 19. The terminal 28 is an editing terminal which enables the editorial department to view the text material and to edit the text material before insertion into the computer. The terminal 28 may include a computer which justifies the text and inserts the necessary code instructions for the typesetter or this may be done by the computer 19. Also, the editorial department will have a scanner 27 corresponding to the scanner 18 for scanning artwork to digitize the latter and convert it to a form for storing into the computer and for use in controlling a phototypesetter to reconstruct the copy.

The classified ad also has a computer terminal 28 of the same type as the computer terminal for the editorial department.

As noted above, the layout department 20 has the responsibility for laying out the newspaper and assigning space to various departments and to the ads to appear in the newspaper. The layout department has a computer terminal 34 which enables the layout department to insert coded data into the computer 19 identifying the space where the various ads and articles are to appear. The computer terminal 34 preferably includes a cathode ray tube display adapted to display page areas of a newspaper and if certain of the page areas have been allocated or assigned by the layout department, these areas will be blocked off, i.e. outlined, and an identification of the article or text material to appear therein will be associated with the area.

As noted above, the editing terminals 21, 28 maybe of a known type such as the type disclosed in U.S. Pat. No. 3,248,705 issued Apr. 26, 1966 to J.E. Dammann et al. The text copy is entered into a storage associated with the terminal by use of a keyboard. The copy is divided into pages, paragraphs, lines, words and finally characters (including blank characters). Signals representing the characters in any known code are stored in the storage to form the copy. The keyboard of the terminal is such that these proper codes are entered when the proper key for the letter or instruction is struck on the keyboard. The terminal also includes other codes necessary such as space, paragraph, etc for storing instruction to be used to form the characters into words, lines and paragraphs. In addition, the terminal is such that the stored text material can be displayed on the face of the cathode ray tube and corrections made in the displayed material, such as insertions and deletions, and then when the copy is as desired, the terminal may prepare a justified or unjustified tape or in some other known manner effect the reading out of the storage for storage into the memory of a computer which will ultimately compose the entire paper. Associated with each text material entered into the computer 19 through the terminals 28 is an identification of the item so that when the layout department assigns the item to a particular location in the newspaper, the computer can locate and compose the item into that location. Each terminal has the necessary codes for entering the identifying headings into the computer 19.

Figure 2:
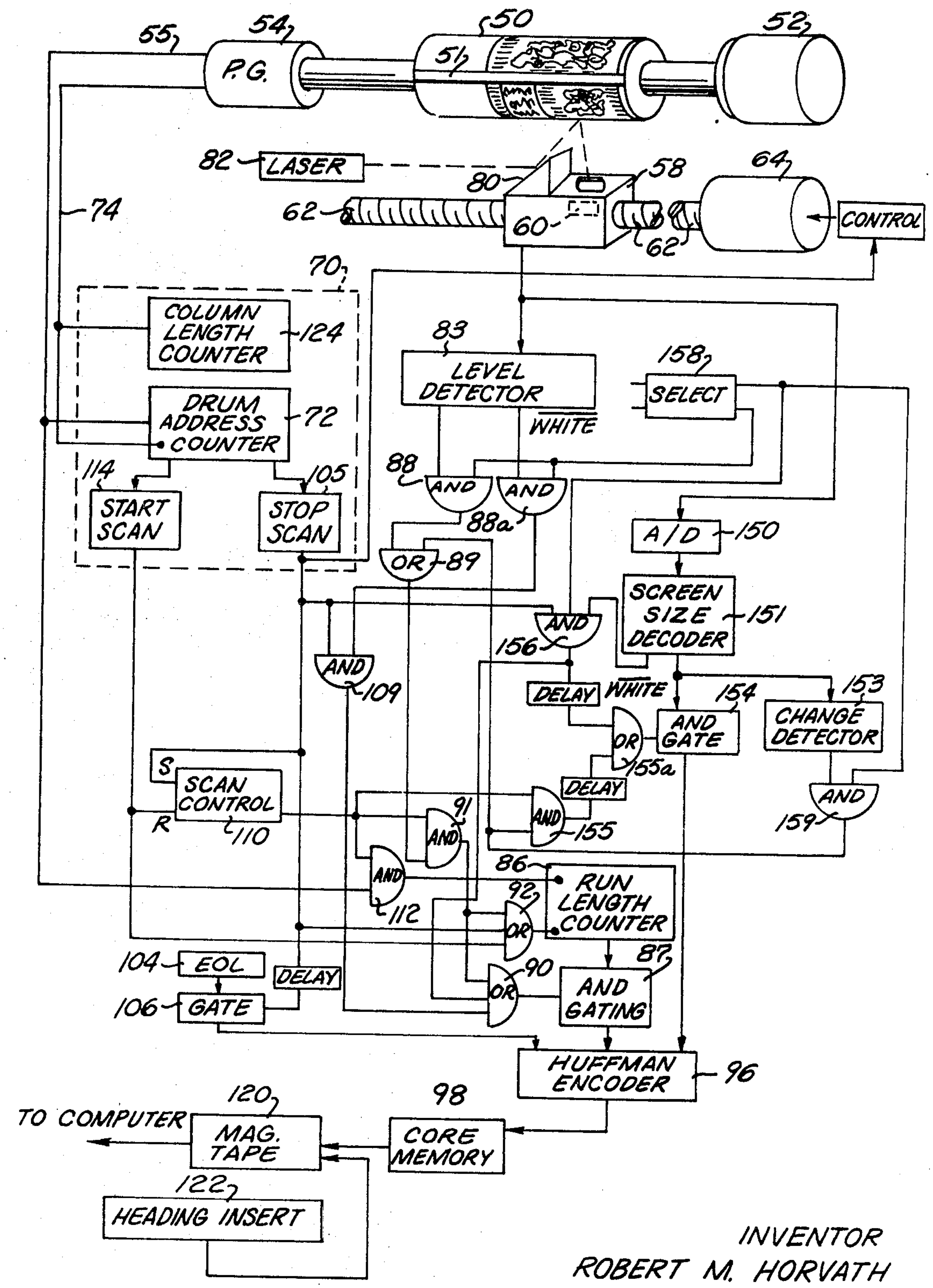
FIG. 2 is a block diagram illustrating a scanner which may be used in practice of the present invention.

A scanner which may be utilized in the practice of the present invention is illustrated in FIG. 2. Referring to FIG. 2, the copy to be scanned is clamped by a clamp 51 onto a drum 50 which is rotated by a motor 52. The motor is a synchronous motor which rotates the drum 50 at a constant speed. A pulse generator 54 is operated by the drum and provides one pulse for a predetermined increment of drum rotation on line 55.

As the copy on the drum 50 is rotated, it is scanned by a scanning head 58 including a photodiode 60. The scanning head 58 is mounted on a lead screw 62 which is rotated by a stepping motor 64 to index the scanning head lengthwise of the drum 50. The stepping motor 64 is stepped one increment for each revolution of the drum 50 so that the scanning head 58 is in a fixed scanning position for one revolution of the drum and then is stepped to an immediately adjacent position for its next scan. Accordingly, the scanning head 58 makes successive scans of the copy with each scan line in a radial plane of the drum 50. Preferably, the scanning lines are variable between 180 and 720 lines per inch.

The scanning head 58 is stepped by a drum addressing circuit 70 which supplies a pulse to the stepping motor for each revolution of the drum 50. As illustrated in FIG. 2, the drum addressing circuit 70 may include a counter 72 for counting the pulses from the pulse generator 54 to provide coded indicia which indicates the address of the angular position of the drum. Preferably, the pulse generator 54 provides a pulse at the start or end of each revolution over a line 74. The signal on line 74 is separate from the increment pulses, and resets the address counter to make sure that any pulse errors do not accumulate.

The scanning head 58 for scanning the copy includes a mirror 80 for directing a scanning beam of light from a laser 82 onto the copy. The light reflected from the copy is detected by the photodiode 60 and the photodiode provides an essentially two-level signal when scanning black and white copies which indicates either black, i.e. a line or mark, or white, i.e. background. At the start of a scan, the copy is assumed to be white and a level detector 83 will detect a white level at the output of the photodiode 60. As the white background is scanned, pulses from the pulse generator 54 are applied through an AND gate 112 to a run-length counter 86 which counts the pulses from the pulse generator 54 to determine the length of a segment of a scan. When the beam strikes a black line or other black portion of the copy, the level from the photodiode to the level detector changes to a black level and the level detector detects this change and provides a gating signal to a gate 87 to gate out the number in the counter and a reset signal to the counter 86. The counter may be the type which is read out by resetting the stages. The signal from he level detector is applied to gating 87 through an AND gate 88, OR gate 89, AND gate 91, and OR gate 90 and to the reset terminal of the counter 86 from the output of AND gate 91 through an OR gate 92. When the readout gate 87 is activated, the number in the counter 86 is gated to a Huffman encoder 96. The Huffman encoder converts the number from the counter 86 to a Huffman code and stores it in a core memory 98.

As the scanning continues, the counter 86 will again count pulses from the pulse generator 54, until the signal changes to a white signal. At this time, the pulse gate 87 will again be activated by the level detector 83 to read the count in the counter 86 and to reset the counter 86. From the foregoing it can be seen that the level detector must give a gating reset signal each time the output level changes from white to black or vice versa. Level detecting circuits for this purpose are within the ability of those skilled in the art and may comprise a multivibrator circuit which is switched to one state at a first level which corresponds to the white level and which resets at a lower level which corresponds to the level slightly higher than that from the black copy.

Each time the drum 50 makes a complete revolution, the scanning of the copy is to ocur on a new line and it must be indicated that a scan path has been completed and a new one is to begin. The drum addressing circuit 70 stores an end-of-line (EOL) code in a storage register 104 and a stop scan register and comparator 105 provides a signal when the count in the counter 72 corresponds to the setting of the stop scan circuit 105. This setting is preferably settable by the operator.

The signal from the stop scan register and comparator 105 is applied through OR gate 92 to effect a resetting of the counter 86 and also is applied to OR gate 90 to activate the readout gating 87 to gate the setting of the run length counter 86 to the Huffman encoder 96. The stop scan signal is also applied with a delay to an AND gate 106 to gate the EOL code to the Huffman encoder.

Since it is not necessary to code a white background run length at the end of a line scan, the stop scan signal activating the readout gate 87 is applied to one input of an AND gate 109 which has its output connected to activate the gating 87 through the OR gate 90. The second input for AND gate 109 is conditioned by a NOT white level output signal from the level detector 83. Consequently, if the signal from the level detector indicates a white signal, no gating to the Huffman encoder occurs in response to the stop scan signal.

The stop scan signal also sets a control bistable multivibrator 110 to stop pulses to the encounter 86 and to prevent a gating of the reading of the run length counter to the Huffman encoder by the level detector. The control multivibrator 110 has a reset or NOT output which is normally conditions AND gate 112 through which pulses are supplied to the counter 86 as well as AND gate 91 through which the change of level signal from the level detector 83 is normally supplied to the readout gating circuit 87 for the run length counter 86.

As noted above, the address counter 72 is reset by the signal on line 74 from the pulse generator 54 at the time clamp 51 starts to move under the scanning head. When clamp 51 clears the scanning head and a new scan is to start, a start scan circuit 114 is activated by the count in the address counter to reset the control multivibrator 110. During the period that the control multivibrator is set, changes in the output level from the level detector will not effect the gating of the zero count in the run length counter 86 to the encoder and when the scan is again started, the first gating to the encoder will be the run length number for the background at the start of the next scan. The start and stop scan registers and comparators 105, 114, may be set to provide the start and stop signals at selected address for the copy drum.

From the foregoing it can now be seen that the scanner provides a run length code which is stored in the core memory 98. The run length code indicates the length of scan of the material which is white beginning at a certain point and then the length of the first black encountered and thereafter the numbers alternatively represent white and black segments. When an end of a circumferential scan is reached, the EOL code is inserted to indicate that a new scan is starting. This information is utilized to operate the beam of a cathode ray tube to reproduce the scanned material. It can be readily understood that if the beam is initially positioned where the scanned copy is to begin along the X or horizontal coordinate and then advanced along a scan line, a number of units corresponding to the segment length of the first white portion of the line without the beam on, i.e. with the beam blanked, and then the beam is turned on while it is moved in a controlled manner a distance represented by the code indicating the length of the black segment and that this is done alternately during each scan as the beam moves across corresponding scan lines, the picture will be reproduced. The end-of-line code after each line scan is used in the reconstruction to reposition the cathode ray tube beam at the original start coordinate in the direction of scanning but with an incremental step corresponding to the step of the scanning head 58 along the orthogonal coordinate.

The core memory 98 for storing the codes is a conventional core memory and serves as a buffer to store the information from the Huffman encoder 96 while the information in the core memory is being put on to magnetic tape by a readout device 120. Associated with the scanning system is also a heading insertion logic device 122 for inserting onto the tape the identification of the copy including the scanning resolution, i.e. the distance increment between circumferential scans, the column length and the column width. The column width will be a standard width and can be inserted by the operator directly from the copy while the column length may be obtained directly from the copy or from the drum addressing circuit. If it is to be obtained directly from the drum addressing circuit, the circuitry will include a column length counter 124 which is activated each time there is an output on line 74 from pulse generator 54. If desired, the column length counter 124 can be utilized to determine the length of scan and in such a case can be preset to a number and when the output of the counter is stepped to zero it will provide a signal to stop the scan.

The Huffman encoder is a conventional encoder which is utilized to reduce the memory capacity necessary for storing the information. In a Huffman encoding circuitry, a code comprised of binary bits is assigned to the run length in accordance with their frequency of appearance so that the run length which appear most frequently require the lesser number of bits for storage.

The information on the magnetic tape prepared by the readout device 120 is entered into the computer memory along with the heading. Alternately, the data may be transferred on a time sharing basis directly from the core memory 98 into the computer 19.

It is desirable, that the level detector be able to scan continuous tone copy. The system thus far described is adapted to scan black-and-white line copy or pictures formed of half-tone dots. In the case of the continuous tone copy as distinguished from a half-tone copy, it is necessary to obtain half-tone information in order to be able to prepare a printing plate. When scanning continuous tone copy, the signal from the scanning head is applied to an analog-todigital converter 150 which has a digital output that indicates the level o the signal rather than to the level detector 83. The numerical output of the A/D circuit 150 is converted to a half-tone screen dot code by a decoder 151. Each screen dot may cover a range of levels in the output from the A/D circuit 150 or the A/D circuit 150 may be such that each change in digital output represents a new screen size. When scanning continuous photographs, the number in the run length counter 86 is printed each time there is a level change resulting in a change in the output of the screen size decoder 151. In operation, when the change occurs in the output of the screen dot decode 151, a change in output circuit 153 provides a signal for activating readout gate 87 through OR gate 89, AND gate 91 and OR gate 90 to gate the run length reading to the Huffman encoder 96 and to also gate the new screen dot to the encoder by activating with a delay a readout gating circuit 154. The output from the change detector 153 is applied to one input of an AND gate 155 whose output is applied through a delay circuit and an OR gate 155*a* to activate the gating 154. The other input of AND gate 155 is conditioned by the reset output of the scan control circuit 110 so that when the scan control circuit is set at the end of an individual scan the change detector 153 will not activate gate 154 until the stop scan control circuit 110 is reset.

Instead of delaying the activation gating 154, the readouts from the counter 86 and from the decoder 151 may be simultaneously gated to buffer storages in the encoder 96 which are read in sequence, so that the number stored in the run length counter is read first into the core storage and then the number representing the new screen dot. The address of the run length counter at the time of the change of the A/D output of circuit 150 will indicate the length of the scan segment for the preceding screen dot. In reproduction, dot characters will be placed along the scan segment a predetermined distance from each other along the scan line as determined by the information in the character storage. In continuous tone scanning, a NOT white signal is supplied from the decoder 151 to AND gate 156 to gate the stop scan signal to activate the readout gate 154 to read out the screen dot for the last run length of a scan only if the copy is NOT white during the last segment scanned. The AND gate 156 has an output which is applied with a delay to OR gate 155*a* for activating gate 154 as well as being applied to the OR gate 90 to activate the readout gating 87 for the run length counter 86.

When the continuous tone circuitry is to be utilized, a select bistable control circuit 158 is set to condition AND gate 159 to pass the signal from change detector 153 and to condition an input of AND gate 156. When operating in a black and white mode, the select circuit is in a reset state to condition AND gates 88, 88*a* to render the level detector 83 effective.

Figure 3:
FIG. 3 illustrates a dot character for preparing half-tone copy.

In reproducing the continuous tone photograph, each screen dot is represented by a "character." A character buffer storage or disk has the instructions for forming each dot character. The dot characters are formed by making the character from a series of closely spaced dots with the spacing and arrangement of the dots or spots varying depending upon the screen size. FIG. 3 shows enlarged dot characters for a given screen size spaced along a line with each character being comprised of a plurality of spots. It will be recognized that if the individual character dots are considered as a character, the dot character can be formed with the same technique as is utilized for forming an alpha character by turning a cathode ray beam on and off at spots which when integrated form the alpha character. Phototypesetting systems which function in this manner are well known in the art.

It will also be seen that the present system is adapted for the use in reproducing color photographs if a color filter is used and the continuous tone copy is scanned for color. In scanning for color, the light from the scanning may be directed along separate paths each containing a particular color filter to obtain the "greytone" level for each color. Also, the computer may be utilized to produce angularly displaced dot patterns for the different colors corresponding to screens angularly disposed with respect to each other in order to avoid moire patterns.

Figure 4:
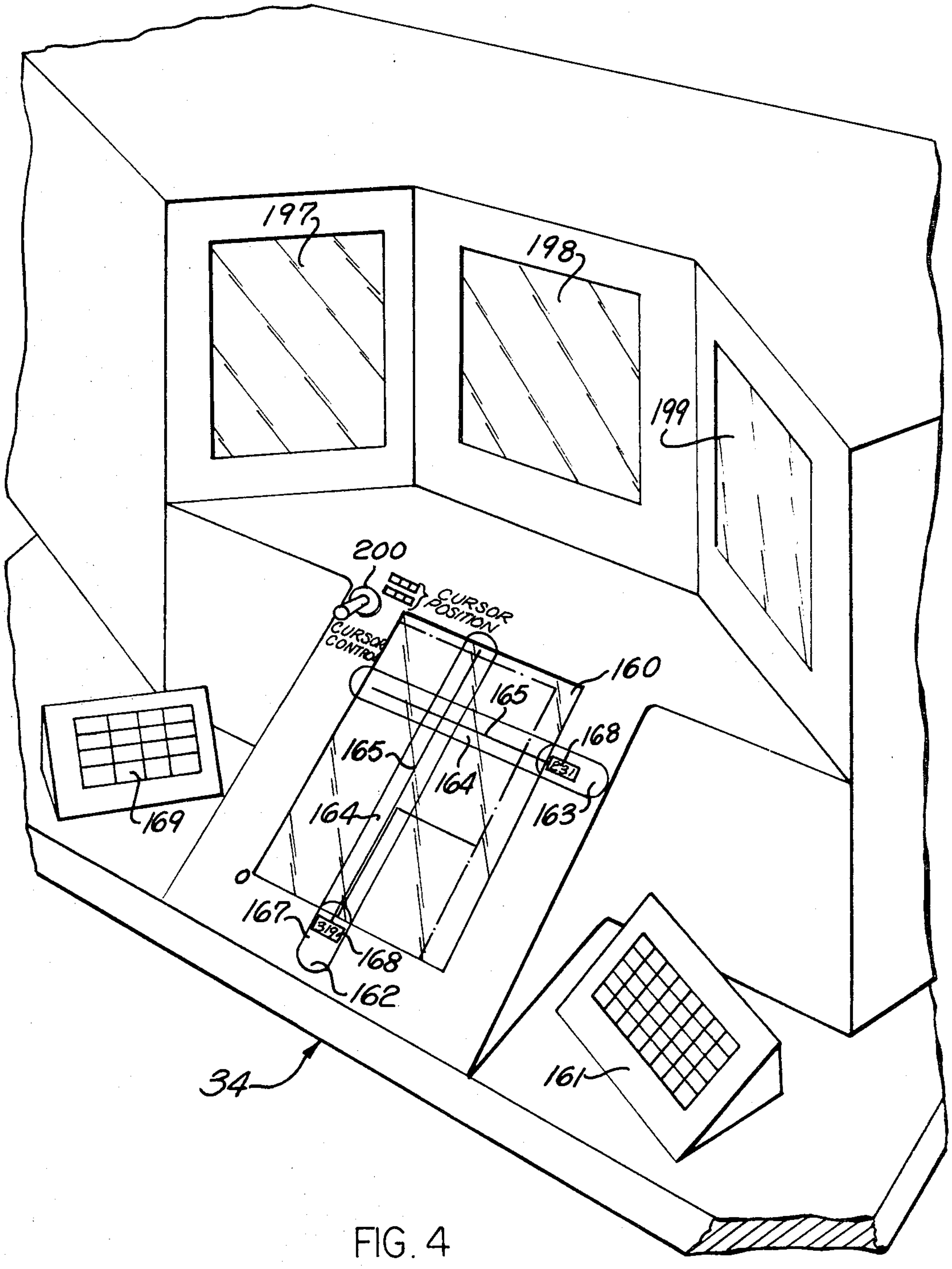
FIG. 4 is a view showing a layout terminal constructed in accordance with the present invention.

As noted above, the layout department allocates space for the national and local ads and also allocates space to the editorial department. The layout department uses the terminal 34 to develop information relating to the space allocated to the ad departments and to the editorial departments and store it in the computer. Referring to FIG. 4, a layout terminal is illustrated which includes a layout cathode ray tube 160. The cathode ray tube 160 is part of a readout display for reading out page layout information stored in the computer. The layout information stored in the computer includes the data necessary to display a page with assigned sections on the page outlined and preferably with a readout of the particular item assigned to the page. Thus, when a section is assigned, data is stored in the computer relating to the page in which the item appears, the identity of the item, and coordinate data which will enable conventional graphic circuitry to outline the assigned sections when a display of the page is requested by the layout department.

The outlining of assigned areas is accomplished by lines which extend parallel to X and Y coordinates for the page. Cathode ray tube terminals for producing graphics and printed legends in response to information stored in the computer are known to those skilled in the art. The layout department in allocating space of sections of a page area, codes the coordinates of the allocated section with respect to a page origin and supplies heading information by operating a conventional alpha-numeric keyboard 161 which includes a key for each character and when the key is struck, a character code is provided so that the character can be called from a character memory and reproduced on the face of the cathode ray tube in a conventional manner. The layout terminal 160 has visual indicating means for deriving the coordinates of a section to be assigned. The visual indicating means comprises an X-coordinate marker 162, and a Y-coordinate marker 163. The X-coordinate marker and the Y-coordinate marker comprise transparent bodies 164 extending parallel to the X- and Y-coordinates respectively, with each body having a sight line 165 thereon which extends perpendicular to the respective coordinate. The X-coordinate marker and the Y-coordinate marker are movable along the X and Y-coordinates, respectively, and each includes a handgrip portion 167 with the handgrip portion carrying a digital display device 168 which indicates the value of the coordinate with respect to the zero origin of the page. It is assumed in the present illustration that the top left hand corner of the CRT is the zero origin for the X and Y-coordinates when a full page is displayed. By moving the marking devices 162, 163, the sight lines 165 can be located to lie along the lines outlining the section to be assigned and to determine the coordinates for the end points of the lines which outline the section to be assigned. Known computer terminals with a cathode ray tube display are adapted to draw lines if given the coordinates of the end points of the lines. As will be recognized by those skilled in the art, the lower right hand sections and the upper right hand sections, etc can be outlined by establishing the coordinates of the corner which is closest to the center of the page. This is true since the other coordinates are the outside edges of the page and a code key on a keyboard 169 can readily provide a code which instructs that the line be drawn from the coordinates of the corner which define the inside corner to the outside edges of the page. Special code keys may be provided for this instruction such as upper right, lower right, upper left and lower left. Also, if the lower right hand corner, for example, has been assigned, the space immediately above the lower right hand corner can also be allocated by striking the lower right corner key after establishing the coordinates of the inside top corner of the space provided the left hand coordinate for the new section is the same as that for the assigned lower right hand corner. While the instruction for outlining the space immediately above the lower right hand corner will effect the drawing of a line to the lower edge of the page along the left hand X-coordinate, it will be immaterial since it will coincide with the left hand side of the outline for the lower right hand corner section. In the absence of such special code keys, the section may be outlined in a conventional display by establishing the coordinates of the corners of the section.

Figure 5:
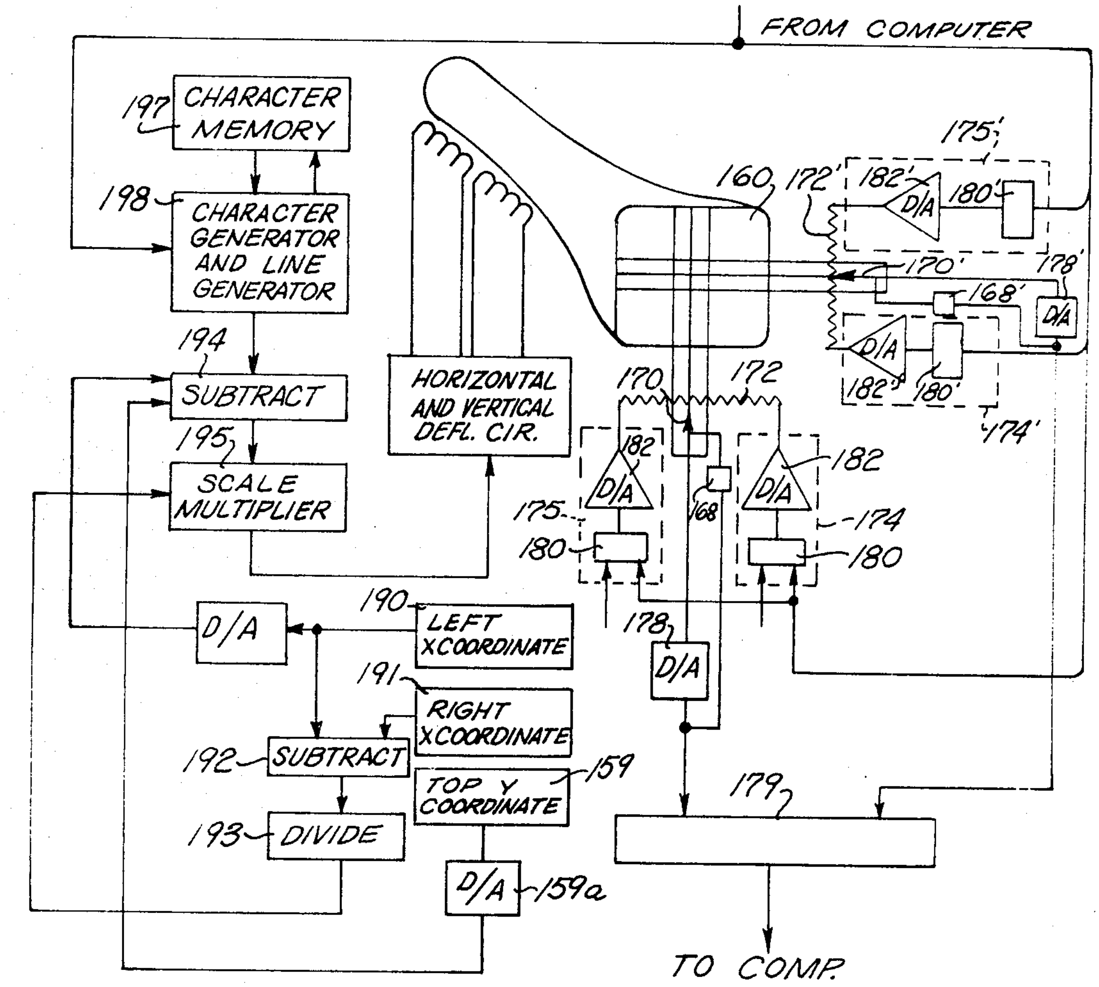
FIG. 5 is an electrical diagram showing circuitry used with the layout terminal of FIG. 4.

The layout cathode ray tube 160 and part of the circuitry for deriving the X and Y-coordinates for a section is illustrated in FIG. 5. Referring to FIG. 5, the movement of the X-coordinate marker along the X-coordinate moves a tap 170 on a potentiometer 172. The potentiometer 172 is connected between a voltage source 174 and a voltage sink 175. The voltage of the sink and the source determine the magnitude of the voltage at the different points along the potentiometer 172 at the ends of the potentiometer. For a full page display on the cathode ray tube, the voltage of the sink will be zero representing zero deflection from the origin along the X-axis and the voltage of the source voltage will be that necessary to effect full deflection of the beam to the right hand side of the page, for example, 10 volts. As the X-coordinate marker 162 is moved, the potential of the sliding tap 170 will change from a minimum of zero where the arm is positioned at the zero coordinate position for the X-axis to a maximum of 10 volts depending upon the position of the arm along the X-coordinate. This voltage is converted to a number by a digital-analog circuit 178 to provide the X-coordinate position. The digital output of the circuit 178 is supplied to an interface circuit 179 and on command may be stored in the computer to indicate a selected X-coordinate value for a line or point. The output of the A/D circuit 178 is also connected to the digital display device 168 on the X-coordinate marker 162 so that the operator may have a direct reading of the coordinate magnitude.

Similar control circuitry is provided for the Y-coordinate marker 163 which is movable along the Y-coordinate and the components in the Y-circuitry have been given the same number as the component at the X-circuitry with prime mark appended thereto. Thus, by positioning the X-coordinate marker along one vertical side of the section to be assigned and the Y-coordinate marker along the horizontal side of the coordinates of the corner formed by the intersecting sides can be readily ascertained.

IN accordance with one feature of the present invention, the operator may select a portion only of the newspaper page to appear on the face of the cathode ray tube and this portion magnified on the face of the tube. For this purpose, the voltage source 174 and the voltage sink 175 are adjustable so that the operator may read the coordinates of the magnified portion with respect to the original page origin and not to the zero origin on the cathode ray tube. If, for example, the lower right hand quarter of the page is to be displayed on the face of the tube, the X-coordinate of the left side of the page, assuming the voltage from zero to full scale on the X-coordinate is 10 volts, is actually going to appear on the cathode ray tube at the zero volt position but in terms of the absolute coordinate of the page it will be the 5 volt position. In this instance, the sink voltage is adjusted to 5 volts and the source voltage is maintained at 10 volts so now the full scale deflection for the cathode ray tube is represented by a 5 volt difference across the potentiometer 172. It will be noted, that this 5 volt difference corresponds to the 5 volt difference which occurs or exists along the X-coordinate scale when the full page is displayed. Accordingly, the potential at the tap 170 is in actuality the deflection voltage measured with respect to the origin of the page. Consequently, as the coordinate markers are moved along the coordinates, the coordinate indication by the digital display devices 168 will be with respect to the page zero and any information supplied to the computer will also be in accordance with page zero.

In order to enable the operator to magnify a selected portion of the page, the source 174 and the sink 175 each include a register 180 and a digital analog converter 182 for converting the setting of the register to an analog voltage. The registers are set to numbers which indicate the value of the X-coordinate which corresponds to that for the left and right hand sides of the section to be displayed. The digital-to-analog converter converts this to a corresponding voltage so that the voltage at the left hand end of the potentiometer corresponds to the X-coordinate value for the left hand side of the section and so that the voltage at the right hand end of the potentiometer corresponds to the X-coordinate value for the right hand side of the section to be displayed.

The circuitry for expanding the scale for the Y-coordinate marker 163 is a duplicate of that for the X-coordinate marker 162 and has been given the same reference numbers as the corresponding X-coordinate components with a prime affixed thereto.

It will also be appreciated that the registers 180, 180′ may be set to expand the page which would normally take less than the full size of the cathode ray tube to that size which is a maximum for the tube.

If the operator is working on an expanded portion of the page, it is necessary for the graphic information being supplied to the cathode ray tube to be modified so that the tube will properly display any allocated sections in the particular area which has been selected. This may be readily accomplished by the operator establishing the right hand and left hand X-coordinate values in registers 190, 191. The terminal 34 includes a subtracting circuit 192 for subtracting the X-coordinate values and a dividing circuit 193 for dividing the full scale voltage for the page display by the difference to obtain the scale factor. The deflection signals to the cathode ray tube from the line and character generator in response to the page readout from the computer may then be altered by subtracting in a circuit 194 the voltage of the lower coordinate X-voltage from the X-deflection signal called for by the character generator and the top Y-coordinate registered in a register 159 and converted to an analog in a D/A circuit **159*a* from the Y-deflection voltage and then multiplying the resultant voltages by the scale factor in a circuit 195**. This will then cause the readout onto the cathode ray tube to correspond with the selected area and to be magnified.

Preferably, the layout terminal also includes a plurality of cathode ray tube displays which enable the layout man to see the information which appears on the facing page and a backside of the requested page and also, in systems which are provided with the magnification feature, a full page display of the page being worked on by the layout operator. Such cathode ray tube displays are indicated by the reference numerals 197, 198, 199. The cathode ray tube for the full page display will not have the magnifying circuitry for modifying the output of the character and line generator associated with the display. The cathode ray tubes 197, 198, 199 will have character memory and generating circuitry and a line generator controlled as in the case of cathode ray tube 160 from the computer on a time sharing basis.

Also, in accordance with the invention, the layout terminal 34 may include a spot type cursor formed by a beam from a cathode ray gun in the display and controlled by a joystick 200. Displays with such cursors are known to those skilled in the art and are such that when the cursor is in a position on the face of the cathode ray tube, the coordinates of the cursor may be entered into the computer on command. It will be appreciated that when a magnified portion of the page is being utilized, the coordinates of the spot will have to be converted to absolute coordinates with respect to the page origin rather than with respect to the deflection origin on the cathode ray tube.

In the case of the X-coordinate, the X-coordinate value of the cursor may be multiplied by a scale factor, one-half in the case where one-half of the page along the X-coordinate is to be displayed on the face of the tube, and by adding the magnitude of the X-coordinate for the left hand side of the section when a full page is displayed. This will convert the X-coordinate magnitude of the cursor relative to the cathode ray tube screen when an expanded section is displayed to a magnitude for displaying the full page on the face of the tube. The Y-coordinate may be similarly converted.

It will be understood from the foregoing that the terminal 34 includes circuitry and controls for entering the coordinates of points on the cathode ray tube into the computer 19 to assign space to an item or a copy. Also, the computer includes those controls necessary to request a display of a page or page section on the cathode ray tubes of the terminals. In addition, the terminal 34 includes a character memory 197, for storing alpha-numeric character generating instructions for causing a character and line generator circuit 198 to provide the necessary deflection signals for the cathode ray tube to generate the character at the position indicated by the computer. The coordinates of the top left hand corner of the assigned section may be utilized by the circuit 198 as the starting coordinates for reproducing the alpha-numeric legend for the item assigned to the section. The character generating circuit 198 will operate to supply deflection signals to initially position the beam in accordance with these coordinates and the character instructions in the memory or from the computer will update the basic positioning signal in a known manner after each character is generated to position the beam for the next character.

The editorial department also has a layout terminal 34 so that the editorial department may subdivide the space allocated to it by the layout department. When the editorial department allocates space, the department will supply alphanumeric information which indicates the nature of the item so that when the item is stored in he computer, the item can be located and printed out when the page is composed.

After the entire newspaper has been stored in the computer memory, the computer may be operated to read out the items page by page and to include the necessary instructions for the phototypesetter. It will be understood that the items on he page may be read out at random and need not be selected in a given order. Consequently, the computer may be programmed to search its memory bank for those items appearing on the page and when an item is located, the computer may operate to prepare a punch tape or magnetic tape or can directly operate the phototypesetter in accordance with the stored information to produce a page copy.

The phototypesetter used with the present invention may be a known typesetter and the computer may be programmed to supply the necessary instructions for operating the typesetter. The manner of programming a computer to provide the necessary instructions for a typesetter to reproduce the copy which has been stored as described in the computer is within the ability of those skilled in the art. The manner of utilizing a computer to provide justification for unjustified text and instructions for interword and spaces as well as for leading purposes is well known.

The phototypesetter controlled by the computer 19 is preferably one in which the character is formed by turning the beam on an off to form dots which define the character. In such a typesetter, the beam may be turned on and off at predetermined locations in accordance with instructions from the character memory as the beam is moved in a raster scan pattern. Such an apparatus is disclosed and described in application Ser. No. 591,734, filed Nov. 3, 1966, now U.S. Pat. No. 3,588,870 and assigned to the same assignee as the present invention. The beam may also be incrementally stepped from position to position where it is to be turned on in response to incremental instructions from the character memory as fully disclosed and described in copending application Ser. No. 710,349, filed Mar. 4, 1968, now U.S. Pat. No. 3,581,302, by Edwin R. Kolb and assigned to the same assignee as the present invention.

Figure 6:
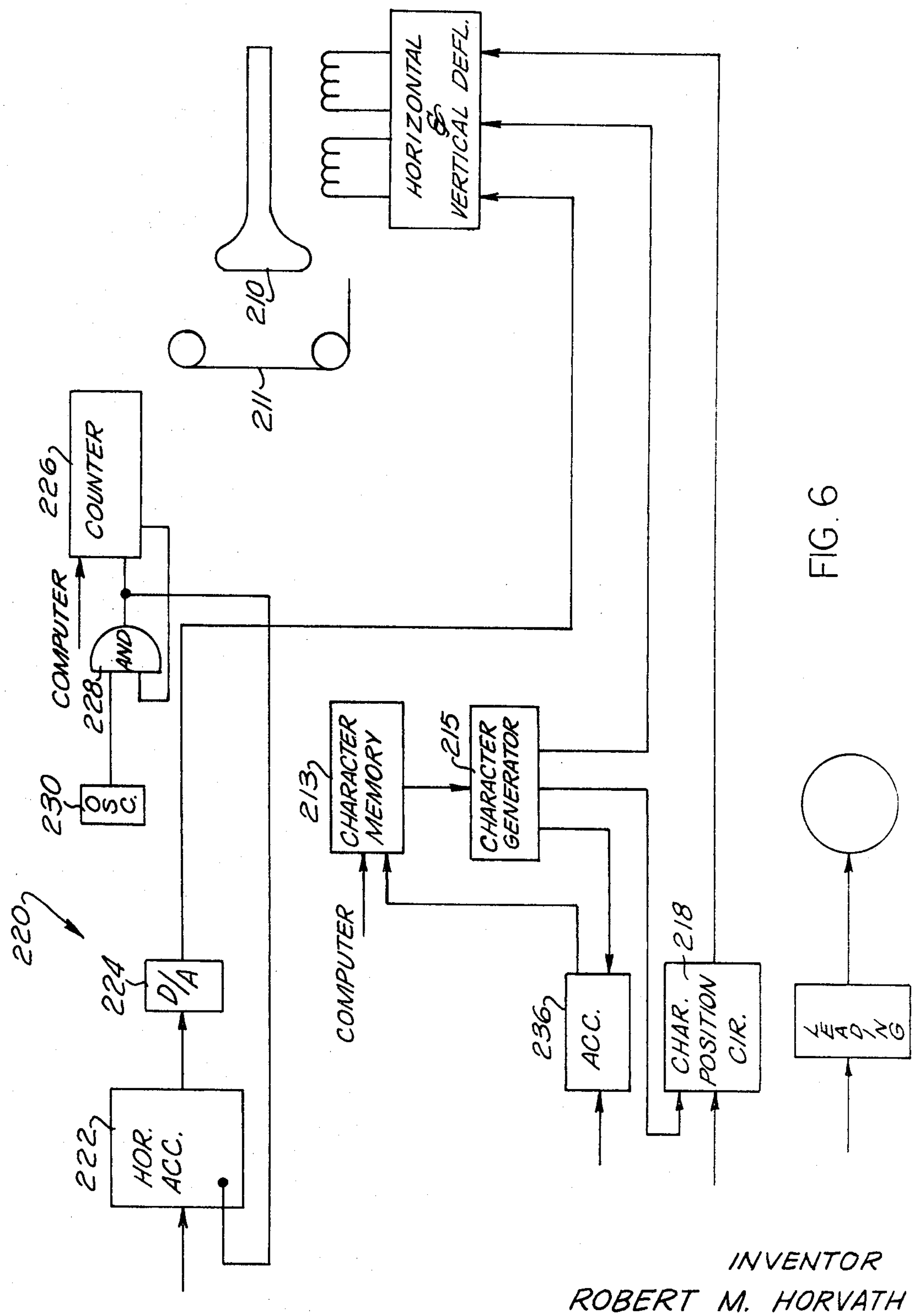
FIG. 6 is a portion of the phototypesetter which may be used in practice of the present invention.

Either type of phototypesetter generally comprises a cathode ray tube 210 for writing the copy onto a film 211. Conventionally, the vertical leading of the copy is obtained by moving the film vertically in response to leading instructions and a leading circuit 212 for this purpose and controlled from the computer has been shown in FIG. 6.

The phototypesetter includes a character memory 213 which stores a font of character instruction to be utilized to control a character generator 215 when the computer requests that a particular character be formed. The character generator provides vertical and horizontal deflection signals for the cathode ray tube 210 to be added to character positioning signals provided by the character positioning circuit 218. The character positioning will receive codes such as interword codes from the computer and as well as data for initially positioning the writing beam. The positioning circuit may receive updating information from the character generator after each character within a word is written by the cathode ray tube to position the beam for the next character in the word.

It is entirely within the skills of those in the art to program the computer 19 to justify the coded text stored therein and to insert codes and instructions necessary to write the text material with the cathode ray tube 210 and the film 211.

For scanned copy the computer provides instructions to the positioning circuit 218 and the leading circuit to properly locate the copy on the page. The phototypesetter preferably includes a scanned copy generator 220 for the reconstruction of the scanned copy. The illustrated scanned copy generator comprises a horizontal accumulator 222 in which the run-length number is set to establish an increment of horizontal deflection along the X-coordinate. At the start of a scan, the computer enters the first white run length into the accumulator and this is converted to a deflection voltage by a D/A converter 224 to deflect the beam a corresponding number of increments. The computer then enters the next run length number, which is for a black signal, into a counter 226. When a number is set into the counter 226, a gate 228 is activated to supply pulses from an oscillator 230 to the horizontal accumulator 222 and to pulse the counter toward zero. This steps the cathodes ray beam incrementally the length of the black segment and the beam is turned on at each step to generate the black segment and expose the film. When the counter reaches zero, the gate 228 is de-activated and the computer enters the run length number of the next white segment in the accumulator etc. until the scan is completed. At that time, the EOL instruction in the computer effects the resetting of the accumulator 222 to zero and the necessary leading in accordance with the resolution data.

When the phototypesetter is being operated to reproduce copy which was continuous tone copy, the computer will address the character memory to provide the necessary instructions for forming the dot character corresponding to the proper screen dot. The run length will be entered into an accumulator 236 and each time a dot character is generated, a specified width stored with the dot character is subtracted from the accumulator. The accumulator will cause the character memory to repeat the character until the accumulator is reduced to zero at which time the computer supplies new instructions. White run lengths are added to the position circuit as an interword space. The end of line instruction will cause the computer to return the character positioning circuit to the start scan position.

As noted above, it is entirely within the ability of those skilled in the art to program the computer to operate as described above to reproduce text material and scanned material stored therein in the manner described.

After the film has been exposed to provide a page of copy, it is developed and used as the copy from which a printing plate is prepared.

While a complete highly automatic system has been disclosed, it will be recognized that features of the system and of the invention may be used independently of each other but to advantage in a more simplified system.

From the foregoing it can be seen that the various departments code text material by striking a conventional character code key for each character to provide a character code which is used to address the character memory. Each item which is stored in this manner and each scanned item which is stored is stored with an identification code which enables the item to be located when the layout information indicates that the item is to be reproduced on a page being prepared and the item is then read from storage to operate the phototypesetter and to reproduce the item at the page location specified by the code layout data. The coded layout data includes the top left and coordinates of the section in which the item is to be displayed and this data may be used in a conventional manner known to those skilled in the art to lead the film to properly locate the item.

What is claimed is:

1. A layout device comprising a cathode ray tube and means for producing graphics on the face of the tube in response to coded data, means for deriving a coordinate of a point on the face of the cathode ray tube comprising a device movable along a coordinate axis, said device having a portion extending perpendicular to the axis across the face of the tube, voltage dividing means having a voltage output which is varied in accordance with the movement of the device along the coordinate, said voltage dividing means having a first pair of terminals and said voltage output being a portion of the voltage difference between first terminals plus the voltage of a first one of said terminals, and adjustable power supply means for selectively varying the voltage applied to at least one of said terminals, and means responsive to said output voltage to provide digital coordinate data.

2. A layout device as defined in claim 1, wherein said device includes deflection means providing a deflection voltage for deflecting the cathode ray beam to provide a display of a normal size in response to coded data, control means for selecting an enlarged screen display of only a portion of said display, means responsive to said control means to increase the deflection in response to data specifying deflection along said coordinate axis and to set said power supply means to establish potentials at said first terminals which provide a voltage output for a given coordinate on the displayed area which is the same as that for the normal size display.

3. A layout device comprising display means for displaying a page to be printed, said display means including visual means for visually displaying in a given size a page on a display area, coordinate indicating means associated with said visual means for indicating the page coordinates designating the location of a page portion on a displayed page with respect to a page origin, the page coordinates being a given function of the coordinates of the display area with respect to a predetermined origin for coordinate axes of the display area, means for enlarging the visual display of a page portion to an enlarged size, and means for adjusting said coordinate indicating means to vary the relationship between the coordinates of the display area and the coordinates of the page portion for indicating the page coordinates of an enlarged page portion so that said coordinate indicating means indicates the page coordinates for a page portion regardless of whether the portion is displayed in its normal or enlarged size.

4. A layout device as defined in claim 3 wherein said means for adjusting said coordinate indicating means comprises means for shifting the origin for the coordinates of the display area and for changing the scale factor for the coordinate values.

5. A layout device as defined in claim 3 wherein said means for adjusting said coordinate indicating means comprises circuit means for selectively establishing voltages of a selected magnitude representing the terminal locations along the coordinate axes for said display area.

6. A layout device as defined in claim 5 wherein said means for adjusting said coordinate indicating means further comprises first means for selecting a portion of the difference of two input voltages provided by circuit means and representing the minimum and the maximum coordinate values along a coordinate axis for the display area, and means for establishing as input signals to said first means signals having a magnitude in accordance with the magnitude of page coordinates of opposite sides of a page area to be displayed.

* * * * *